(12) United States Patent
Ghosh et al.

(10) Patent No.: US 10,885,486 B2
(45) Date of Patent: Jan. 5, 2021

(54) SYSTEM AND METHOD FOR DETERMINING AUTOMATION POTENTIAL OF A PROCESS

(71) Applicant: Genpact Luxembourg S.a.r.l., Luxembourg (LU)

(72) Inventors: Shantanu Ghosh, Gurgaon (IN); Vivek Saxena, Gurgaon (IN); Rajesh Sanghvi, Gurgaon (IN); Vikram Jha, Kolkata (IN); Lavi Sharma, Noida (IN); Harmeet Kaur, Gurgaon (IN)

(73) Assignee: GENPACT LUXEMBOURG S.A.R.L., Luxembourg (LU)

( * ) Notice: Subject to any disclaimer, the term of this patent is extended or adjusted under 35 U.S.C. 154(b) by 154 days.

(21) Appl. No.: 15/626,029

(22) Filed: Jun. 16, 2017

(65) Prior Publication Data
US 2018/0365617 A1    Dec. 20, 2018

(51) Int. Cl.
*G06Q 10/06* (2012.01)
*G06Q 10/10* (2012.01)

(52) U.S. Cl.
CPC ... *G06Q 10/06375* (2013.01); *G06Q 10/0633* (2013.01); *G06Q 10/0635* (2013.01); *G06Q 10/06313* (2013.01); *G06Q 10/103* (2013.01)

(58) Field of Classification Search
None
See application file for complete search history.

(56) References Cited

U.S. PATENT DOCUMENTS

| 6,882,723 B1* | 4/2005 | Peterson | G06Q 10/0639 379/265.01 |
| 8,019,640 B2* | 9/2011 | Barel | G06Q 10/06375 705/7.32 |
| 2005/0065831 A1* | 3/2005 | Keay | G06Q 10/06315 705/7.25 |
| 2006/0206366 A1* | 9/2006 | Habib | G06Q 10/06 705/7.22 |

(Continued)

OTHER PUBLICATIONS

Sutherland (2014) "The Evolving Maturity of Robotic Process Automation" (retrieved from https://www.automationanywhere.com/images/guides/hfs_rpa_maturity_model.pdf) (Year: 2014).*

*Primary Examiner* — Sujay Koneru
(74) *Attorney, Agent, or Firm* — Klarquist Sparkman, LLP

(57) ABSTRACT

The present disclosure relates to determining automation potential of a process by dividing the process into subsidiary processes corresponding to five hierarchical tiers, assessing the subsidiary processes by selecting a value for each of one or more parameters for each of the subsidiary processes at the tier five, computing a score for the subsidiary processes at the tier five based on the selected values, identifying a category of automation for the subsidiary processes in the tier five based on the score for the subsidiary processes at the tier five; determining an automation potential indicator for the subsidiary processes in the tier five based on the category of automation and the score; computing a maximum automation potential indicator and an automation potential indicator at each hierarchical tier based on a maximum automation potential indicator and an automation potential (Continued)

indicator at immediately lower tier to compute the automation potential for the process.

30 Claims, 6 Drawing Sheets

(56) References Cited

U.S. PATENT DOCUMENTS

| | | | | |
|---|---|---|---|---|
| 2006/0271443 | A1* | 11/2006 | Cahalane | G06Q 30/02 705/26.41 |
| 2009/0144120 | A1* | 6/2009 | Ramachandran | G06Q 10/0633 705/7.27 |
| 2010/0312590 | A1* | 12/2010 | Arunachalam | G06Q 10/0631 705/7.12 |
| 2012/0166246 | A1* | 6/2012 | Simon | G06F 8/10 705/7.26 |
| 2013/0173349 | A1* | 7/2013 | Raman | G06Q 10/06311 705/7.36 |
| 2016/0092804 | A1* | 3/2016 | Shikano | G06Q 10/0633 705/7.27 |
| 2016/0140475 | A1* | 5/2016 | Ghosh | G06Q 10/06395 705/7.41 |
| 2016/0274558 | A1* | 9/2016 | Strohmenger | G05B 19/0428 |

* cited by examiner

|  |  | 34% | 26% | 39% |
|---|---|---|---|---|
| Tier one process - RTR | Maximum Automation Potential | Basic + ML + Cog | Basic + ML | Basic |
|  | 47 | 16 | 12 | 18 |
| Tier two subsidiary processes | Maximum Automation Potential | Basic + ML + Cog | Basic + ML | Basic |
| Intercompany Accounting | 68 | 25 | 17 | 26 |
| Treasury | 56 | 15 | 26 | 15 |
| Consolidations and External Reporting | 57 | 12 | 12 | 34 |
| Statutory Accounting | 55 | 31 | 8 | 17 |
| Fixed Asset Accounting | 23 | 5 | 10 | 8 |
| Product Costing | 53 | 0 | 23 | 30 |
| Finance Master Data Maintenance | 62 | 13 | 10 | 38 |
| Inventory Controlling | 60 | 14 | 10 | 36 |
| Transfer Pricing | 59 | 0 | 34 | 25 |
| Manufacturing controlling | 58 | 2 | 27 | 29 |
| Management Reporting | 56 | 36 | 5 | 15 |
| Tax | 47 | 11 | 10 | 27 |
| General Accounting | 29 | 18 | 4 | 6 |

Figure 5A

| Tier one process - RTR | Current Automation Potential | Basic + ML + Cog | Basic + ML | Basic |
|---|---|---|---|---|
|  | 43 | 16 | 9 | 18 |
| Tier two subsidiary processes | Current Automation Potential | Basic + ML + Cog | Basic + ML | Basic |
| Intercompany Accounting | 54 | 14 | 2 | 37 |
| Treasury | 57 | 23 | 3 | 31 |
| Consolidations and External Reporting | 48 | 19 | 2 | 27 |
| Statutory Accounting | 51 | 23 | 7 | 21 |
| Fixed Asset Accounting | 53 | 19 | 4 | 29 |
| Product Costing | 50 | 10 | 9 | 30 |
| Finance Master Data Maintenance | 26 | 6 | 5 | 15 |
| Inventory Controlling | 28 | 3 | 6 | 18 |
| Transfer Pricing | 41 | 3 | 2 | 36 |
| Manufacturing controlling | 39 | 26 | 4 | 9 |
| Management Reporting | 18 | 5 | 13 | 0 |
| Tax | 31 | 11 | 14 | 7 |
| General Accounting | 43 | 20 | 19 | 5 |

Figure 5B

SYSTEM AND METHOD FOR DETERMINING AUTOMATION POTENTIAL OF A PROCESS

FIELD OF INVENTION

The present disclosure relates to determination of automation potential and particularly to methods and systems for quantification of potential for automation of processes.

BACKGROUND OF THE INVENTION

This section is intended to provide information relating to the field of the invention and thus any approach/functionality described below should not be assumed to be qualified as prior art merely by its inclusion in this section.

Enterprises invest significant amounts of money every year for automation of processes. However, the huge investments done in performing automation does not ensure better value for investments or reduced chances of failure. With the advancements in technology happening at a rapid pace, it is not much fruitful to use technologically advanced automated components and still be able to achieve only a small percentage of the total attainable automation potential. Therefore, it is necessary to perform an assessment of a process/project and determine the potential for automation before automating a project.

However, even an assessment for potential performed beforehand may not result in achieving greater returns from the investments. This is because of lack of a structured approach towards assessing a potential scope of automation for the processes. The existing tools involve the service providers manually studying the process of the client in an unstructured way such as through blueprinting, process study, interviews and existing Standard Operating Procedures (SOPs) for assessing the potential scope of automation. Such an approach may give varied results when done by different persons as there is scope for bias and difference in interpretation of a particular activity by different individuals. The existing tools for assessment of automation potential also do not account for a structured practice and future potential of the automation for a sub-process. Thus, the present tools work mostly in isolation with no end-to-end view and do not incorporate micro level assessments of the process encompassing across sub-processes and dimensions for automation.

Moreover, technologies such as Machine Learning and Cognitive being relatively new do not have significant proof points on the application and the domains where such technologies could be implemented to generate value. Thus, there are no comprehensive tools available for assessment of potential for automation including recommending the type and extent of automation best suited for a process.

SUMMARY OF THE INVENTION

This section is provided to introduce certain objects and aspects of the disclosed methods and systems in a simplified form that are further described below in the detailed description. This summary is not intended to identify the key features or the scope of the claimed subject matter.

In view of the shortcomings of existing methods and systems, as discussed in the background section, it is apparent that there exists a need for developing an improved solution that not only overcomes the problems of the prior art in finding an accurate automation potential of the process but also advantageously used to measure potential scope of automation for a process as a quantifiable value that can be quoted or compared. It is, therefore, an object of the disclosed invention to provide a method and system that measures the current as well as future automation potential.

More particularly, the object of the invention is to facilitate identification of gap between an ideal potential and the current state potential for the process basis the defined parameters. Yet another object of the invention is to provide a reliable method and system to provide a productivity potential assessment and a robotic maturity assessment for the process.

In view of these and other objects, the present invention relates to methods and systems for determination of automation potential of a process. More particularly, in one embodiment, the invention discloses a method for determining automation potential of a process. The method for determining an automation potential of a process comprises dividing the process into one or more subsidiary processes, wherein the process corresponds to highest hierarchical tier and the one or more subsidiary processes correspond to lower hierarchical tiers. Each of the lower hierarchical tiers include at least one subsidiary process, wherein the hierarchical tiers are tier one, tier two, tier three, tier four and tier five. The method comprises assessing the one or more subsidiary processes by selecting a value from one or more values for each of one or more parameters for each of the one or more subsidiary processes in the tier five. A score for each of the one or more subsidiary processes in the tier five is then computed based on the selected values for each of the one or more parameters and a predetermined weight assigned to each of the one or more parameters. Further, a category of automation is identified for each of the one or more subsidiary processes in the tier five based on the score for each of the one or more subsidiary processes in the tier five. The method further comprises determining a current automation potential indicator for each of the one or more subsidiary processes in the tier five based on the category of automation and the score. Furthermore, a maximum automation potential indicator and a current automation potential indicator are computed for each of the one or more subsidiary processes in the tier four based on maximum automation potential indicators and the current automation potential indicators for the corresponding one or more subsidiary processes in the tier five. The method then comprises computing a maximum automation potential indicator and a current automation potential indicator for each of the one or more subsidiary processes in the tier three based on the maximum automation potential indicators and the current automation potential indicators for the corresponding one or more subsidiary processes in the tier four. Subsequently, the method comprises computing a maximum automation potential indicator and a current automation potential indicator for each of the one or more subsidiary processes in the tier two based on the maximum automation potential indicators and the current automation potential indicators for the corresponding one or more subsidiary processes in the tier three. Finally, the method comprises computing a maximum automation potential and a current automation potential indicator for the process at the tier one based on the maximum automation potential indicators and the current automation potential indicators for the one or more subsidiary processes in the tier two, wherein the current automation potential indicator for the process at the tier one represents the automation potential of the process.

Further, the present invention relates to a system for determination of automation potential of a process, the system comprising one or more hardware processors and a tangible, non-transitory memory configured to communicate with the one or more hardware processors, the tangible, non-transitory memory having instructions stored thereon that, when executed by the one or more hardware processors, configure the one or more hardware processors to: divide the process into one or more subsidiary processes, wherein the process corresponds to highest hierarchical tier and the one or more subsidiary processes correspond to lower hierarchical tiers and each of the lower hierarchical tiers include at least one subsidiary process, and wherein the hierarchical tiers are tier one, tier two, tier three, tier four and tier five. Further, the one or more hardware processors are configured to assess the one or more subsidiary processes by selecting a value from one or more values for each of one or more parameters for each of the one or more subsidiary processes in the tier five, compute a score for each of the one or more subsidiary processes in the tier five, wherein the score is computed based on the selected values for each of the one or more parameters and a predetermined weight assigned to each of the one or more parameters and then identify a category of automation for each of the one or more subsidiary processes in the tier five based on the score for each of the one or more subsidiary processes in the tier five. The one or more hardware processors are configured to further determine a current automation potential indicator for each of the one or more subsidiary processes in the tier five based on the category of automation and the score, compute a maximum automation potential indicator and a current automation potential indicator for each of the one or more subsidiary processes at the tier four by calculating the average of the maximum automation potential indicators and the current automation potential indicators for the corresponding one or more subsidiary processes in the tier five, computing a maximum automation potential indicator and a current automation potential indicator for the one or more subsidiary processes in the tier three based on the maximum automation potential indicators and the current automation potential indicators for the corresponding one or more subsidiary processes in the tier four, computing a maximum automation potential indicator and a current automation potential indicator for each of the one or more subsidiary processes in the tier two based on the maximum automation potential indicators and the current automation potential indicators for the corresponding one or more subsidiary processes in the tier three and computing a maximum automation potential and a current automation potential indicator for the process at the tier one based on the maximum automation potential indicator and the current automation potential indicators for the one or more subsidiary processes in the tier two, wherein the current automation potential indicator for the process at the tier one represents the automation potential of the process.

Furthermore, the present invention relates to a non-transitory computer readable medium having embodied thereon computer program instructions for determining an automation potential of a process, the computer program instructions comprising instructions for configuring a processor to perform operations comprising dividing the process into one or more subsidiary processes, wherein the process corresponds to highest hierarchical tier and the one or more subsidiary processes correspond to lower hierarchical tiers. Each of the lower hierarchical tiers include at least one subsidiary process, and the hierarchical tiers are tier one, tier two, tier three, tier four and tier five. The operations further comprise assessing the one or more subsidiary processes by selecting a value from one or more values for each of one or more parameters for each of the one or more subsidiary processes in the tier five. A score for each of the one or more subsidiary processes is then computed at the tier five based on the selected values for each of the one or more parameters and a predetermined weight assigned to each of the one or more parameters. Further, a category of automation is identified for each of the one or more subsidiary processes in the tier five based on the score for each of the one or more subsidiary processes at the tier five. The operations further comprise determining a current automation potential indicator for each of the one or more subsidiary processes in the tier five based on the category of automation and the score. Furthermore, a maximum automation potential indicator and a current automation potential indicator are computed for each of the one or more subsidiary processes in the tier four based on a maximum automation potential indicator and the current automation potential indicator for the corresponding one or more subsidiary processes in the tier five. The processor is further configured to perform operations comprising computing a maximum automation potential indicator and a current automation potential indicator for each of the one or more subsidiary processes in the tier three based on the maximum automation potential indicators and the current automation potential indicators for the corresponding one or more subsidiary processes in the tier four. Subsequently, the operations comprise computing a maximum automation potential indicator and a current automation potential indicator for each of the one or more subsidiary processes in the tier two based on the maximum automation potential indicators and the current automation potential indicators for the corresponding one or more subsidiary processes in the tier three and computing a maximum automation potential and a current automation potential indicator for the process at the tier one based on the maximum automation potential indicators and the current automation potential indicators for the one or more subsidiary processes in the tier two, wherein the current automation potential indicator for the process at the tier one represents the automation potential of the process.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Some drawings may indicate the components using block diagrams and may not represent the internal circuitry of each component. It will be appreciated by those skilled in the art that disclosure of such drawings include disclosure of electrical components or circuitry commonly used to implement such components.

FIGS. 5A and 5B illustrate exemplary interfaces of the present invention displaying a maximum automation potential indicator and a current automation potential indicator for the process at tier one, in accordance with an embodiment of the present invention.

DETAILED DESCRIPTION OF THE INVENTION

The following description of example methods and systems is not intended to limit the scope of the description to the precise form or forms detailed herein. Instead in the following description, for the purposes of explanation, various specific details are set forth in order to provide a thorough understanding of the disclosed embodiments. It will be apparent, however, that the disclosed embodiments may be practiced without these specific details.

Several features described hereafter can each be used independently of one another or with any combination of other features. However, any individual feature may not address any of the problems discussed above or might address only some of the problems discussed above. Some of the problems discussed above might not be fully addressed by any of the features described herein.

While aspects of described system and method for determining automation potential of a process may be implemented in any number of different computing systems, environments, and/or configurations, the embodiments are described in the context of the following exemplary system.

The present invention relates to method and system for determining automation potential of a process. The process may be a process related to fields such as finance, accounting, auditing, management etc. The invention encompasses division of a process into one or more subsidiary processes corresponding to one or more hierarchical tiers and computing automation potential corresponding to the one or more hierarchical tiers. The invention includes computing a score based on values selected for one or more parameters for each of the one or more subsidiary processes at the lowest hierarchical tier and computing current automation potential indicator and a maximum automation potential indicator for each of the one or more subsidiary processes at the lowest hierarchical tier. The automation potential indicator assessed includes the category of automation for the process, wherein the category of automation is one of a Basic Robotic Automation, Machine learning along with Basic Robotic Automation and Basic and Machine Learning along with Cognitive Automation. This assessment is then aggregated and extrapolated to 100 as a score at each tier from the lowest hierarchical tier to the highest hierarchical tier to arrive at an existing maturity level for the one or more subsidiary processes or the process. The invention further encompasses identifying a total productivity expected to reap out post the automation of subsidiary processes at the time of automation assessment.

Figure 1:
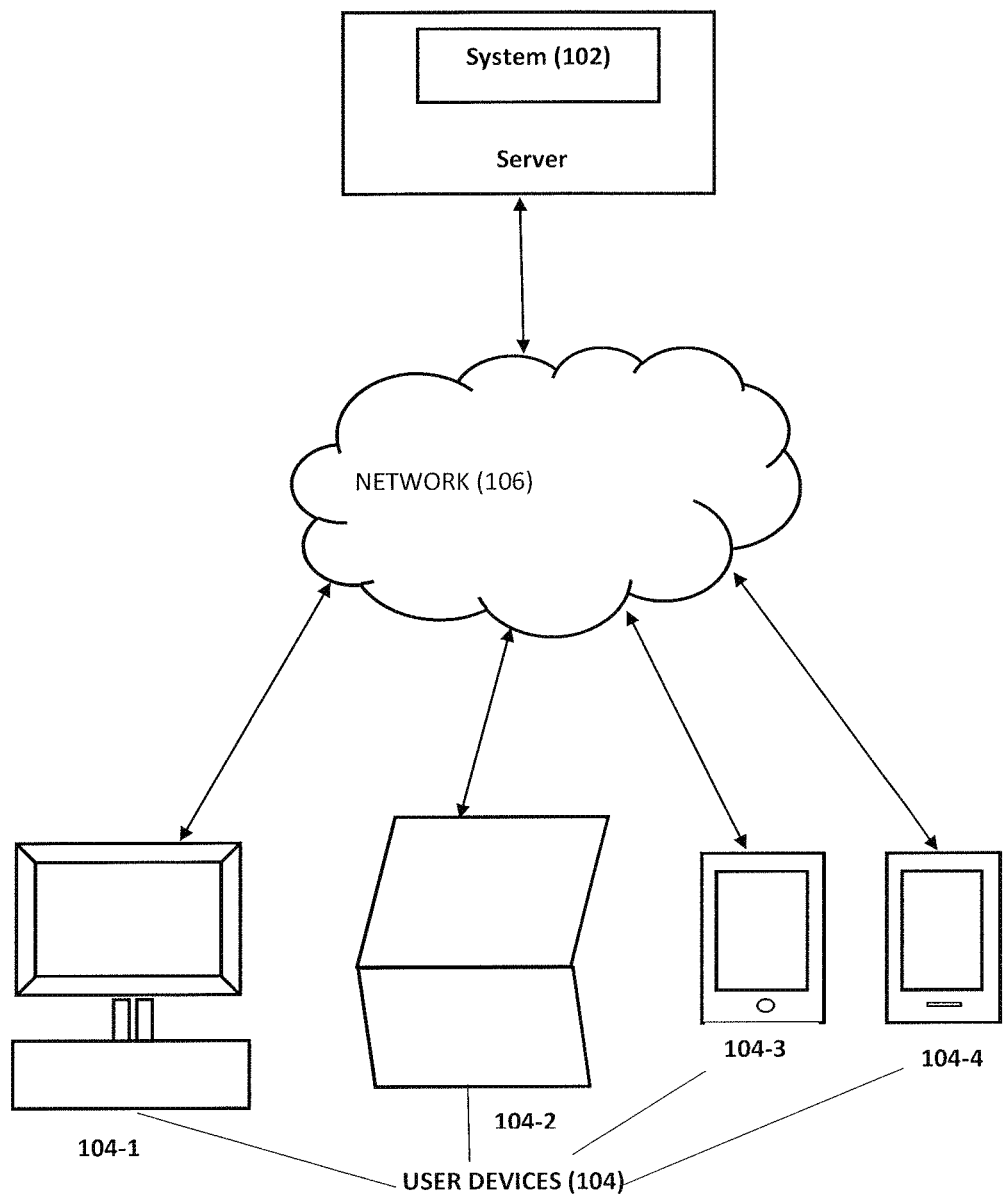
FIG. 1 illustrates an exemplary network architecture including a system for determining automation potential of a process, in accordance with an embodiment of the present disclosure.

FIG. 1 illustrates a network implementation of an exemplary architecture (100) including a system (102) for determining automation potential for a process, in accordance with an embodiment of the present disclosure. More particularly, FIG. 1 illustrates a system (102), and one or more user devices (104) communicatively coupled to the system (102) over a network (106). In one embodiment, the network may be a wireless network, a wired network, or a combination thereof. The network may be implemented as one of the different types of networks, such as intranet, local area network (LAN), wide area network (WAN), the internet, etc. The network may either be a dedicated network or a shared network. The shared network may represent an association of the different types of networks that use a variety of protocols (e.g., Hypertext Transfer Protocol (HTTP), Transmission Control Protocol/Internet Protocol (TCP/IP), Wireless Application Protocol (WAP), etc.) to communicate with one another. Further, the network may include a variety of network devices, including routers, bridges, servers, computing devices, storage devices, etc.

Although the present disclosure is explained considering that the system (102) is implemented on a server, it is appreciated that the system (102) may also be implemented in a variety of computing systems, such as a laptop computer, a desktop computer, a notebook, a workstation, a mainframe computer, a portable electronic device and the like. In one embodiment, the system (102) may be implemented in a cloud-based environment. It is also appreciated that the system (102) may be accessed by multiple users through one or more user devices 104-1, 104-2, ... 104-n, collectively referred to as user devices (104) hereinafter, or applications residing on the user devices 104. Examples of the user devices (104) may be electronic devices including, but not limited to, a portable computer, a tablet computer, a personal digital assistant, a handheld device, a cellular phone, a wireless device and a workstation.

Figure 2:
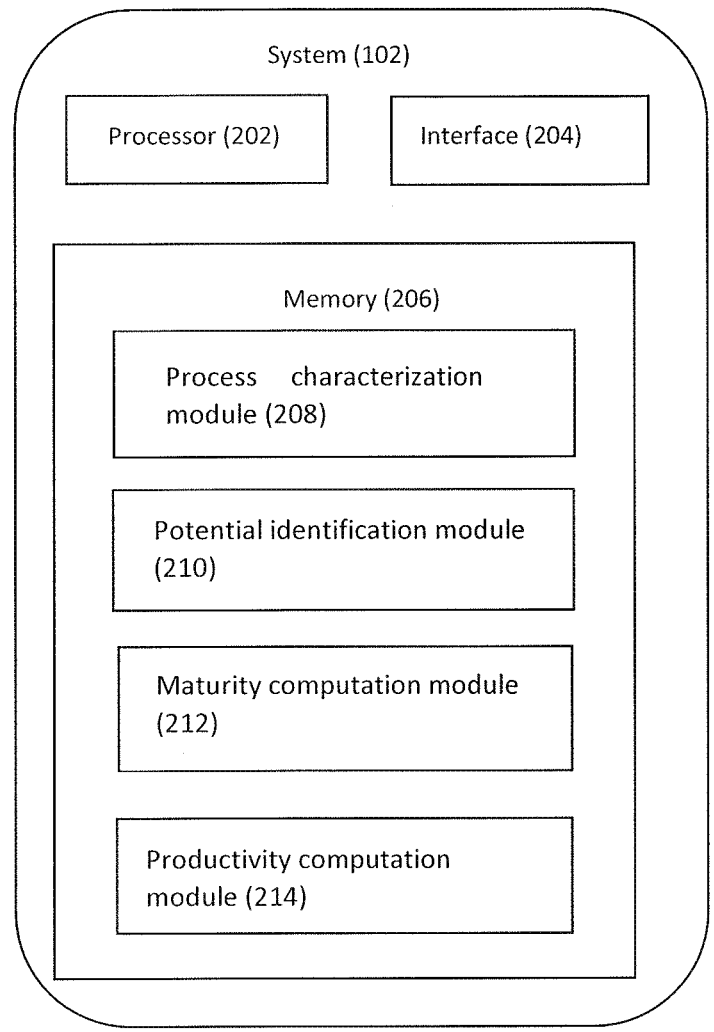
FIG. 2 illustrates a block diagram of an exemplary system for determining automation potential of a process, in accordance with an embodiment of the present disclosure.

FIG. 2 illustrates a block diagram of a system (102) for determination of an automation potential of the process, in accordance with exemplary embodiments of the present disclosure. The system, illustrated in FIG. 2, for determining automation potential of the process is implemented through a specialized arrangement of structural components capable of executing the desired functionalities as described herein below. In one embodiment, the system (102) includes one or more processors (202), an Input/Output Interface (204) and a memory (206). The one or more processors (202) are hardware processors and may be implemented as one or more microprocessors, microcomputers, microcontrollers, digital signal processors, central processing units, state machines, logic circuitries, and/or any devices that manipulate signals based on operational instructions. Among other capabilities, the one or more hardware processors (202) are communicatively coupled to the memory (206). The one or more processors (202) may be configured to fetch and process instructions (e.g. stored in the memory (206)) for execution within the system (102), including instructions stored within the memory (206).

The I/O interface (204) may include a variety of software and/or hardware interfaces, for example, a web interface, a graphical user interface, etc. The I/O interface (204) allows the system (102) to interact with a user either directly or through the user devices (104). The user of the system (102) may include, but not limited to, a client accessing the system (102) to determine the automation potential of its process and an administrator accessing the system (102) for configuration of system (102). Further, the I/O interface (204) may enable the system (102) to communicate with other computing devices, such as web servers and external data servers (not shown). The I/O interface (204) can facilitate multiple communications within a wide variety of networks and protocol types, including wired networks (e.g. LAN, cable networks, etc.) and wireless networks (e.g., WLAN, cellular networks, or satellite networks). The I/O interface (204) may include one or more ports for connecting a number of devices to one another or to another server.

The memory (206) includes any tangible, non-transitory computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, optical disks, and magnetic tapes. The memory (206) includes a process characterization module (208), a potential identification module (210), a maturity computation module (212) and a productivity computation module (214).

The process characterization module (208), the potential identification module (210), the computation module (212) and the productivity computation module (214) may include routines, programs, objects, components, data structures, etc., which perform particular tasks, functions or implement particular abstract data types.

In one embodiment, the process characterization module (208) is configured to divide the process into one or more subsidiary processes corresponding to one or more hierarchical tiers. In a preferred embodiment, the hierarchical tiers are tier one, tier two, tier three, tier four and tier five. For instance, tier one includes the end-to-end process to be divided, tier two includes the process areas within the end-to-end process, tier three includes sub-processes within each of the processes for all process areas of tier two, tier four includes activities or process steps within each of the sub-processes for all sub-process of tier three and tier five includes tasks or transactions at a keystroke level within each of the activities for all activities of tier four. In one embodiment, the number of hierarchical tiers is more than five. In another embodiment, the number of hierarchical tiers is less than five. The division of the process is done such that the process corresponds to highest hierarchical tier and the one or more subsidiary processes correspond to lower hierarchical tiers such that each of the lower hierarchical tiers include at least one subsidiary process.

The system (102) further comprises a potential identification module (210) configured to assess the one or more subsidiary processes at the tier five by selecting a value from one or more values corresponding to each of one or more parameters for each of the one or more subsidiary processes at the tier five. Each of the one or more subsidiary processes at the tier five generate hundreds of thousands of combinations on performing assessment with one or more parameters. The potential identification module (210) is configured to process the combinations to compute the automation potential for the each of the subsidiary processes at tier five. The one or more parameters which influence the potential for process automation are pre-defined and are based on specific pre-determined factors. The one or more parameters include, but not limited to, nature, data, rules, stability, re-Work, supervision, repetition, interfaces, frequency, automation, risk, peak-load. The one or more parameters may be grouped into one or more types depending on the degree of co-relation with the categories of automation. The parameters may be grouped into at least one type of types: confirmatory, exploratory and informatory parameters depending on the degree of co-relation with the types of automation. In a preferred embodiment, the categories of automation are basic robotic automation, basic robotic along with machine learning automation and basic robotic along with machine learning and cognitive automation.

In one embodiment, the invention encompasses assigning a pre-defined relative percentage weightage to the one or more parameters and a pre-defined weight to the one or more values for each of the one or more parameters. The invention encompasses allowing modifying the pre-defined relative percentage weightage for the one or more parameters and the pre-defined weight for the one or more values at any time by the user directly or through user devices (104).

The system (102) may be configured to assess the scope and nature of automation and recommend basic robotic automation for one or more subsidiary processes which include rule based, repetitive, routine tasks. Further, macros/scripts may be implemented to automate repetitive tasks. The implementation costs and timelines for the basic automation are lower as compared to machine learning and cognitive automation.

The system (102) may be configured to recommend machine learning automation for one or more subsidiary processes which are generally non-routine. Machine learning automation for such one or more subsidiary processes is based on a self-learning mechanism i.e. the automation mechanism of the system (102) works in such a way that the automation mechanism is able to alter the decision process based on experience.

The system (102) may be configured to recommend cognitive automation for one or more subsidiary processes which require decisions based on data analysis. Cognitive automation emulates the decision-making ability of a human expert to solve complex problems and is targeted to deliver meaningful, insightful outputs and come to conclusions based on inferences. The implementation costs and time frames of cognitive automation are higher as compared to basic automation.

The potential identification module (210) is configured to compute a score for each of the one or more subsidiary processes at the tier five, wherein the score is based on the values selected for each of the one or more parameters and a predefined relative weight percentage assigned to each of the one or more parameters.

The potential identification module (210) is further configured to identify a category of automation for each of the one or more subsidiary processes in the tier five based on the score for each of the one or more subsidiary processes at the tier five. The potential identification module (210) is also configured to determine a level of automation within each category of automation based on the score for each of the one or more subsidiary processes at the tier five. In an embodiment, the potential identification module (210) is configured to identify the level of automation in terms of one of High, Medium and Low within each category of automation. In an embodiment, the potential identification module (210) may determine no corresponding category of automation, where automation is determined to be not required for one or more subsidiary processes based on the score. Table 1 illustrates an exemplary threshold range of values for each of the categories of automation corresponding to each of the levels of automation.

TABLE 1

|  | High | Medium | Low |
| --- | --- | --- | --- |
| No Automation |  | 33-45 |  |
| Basic + Machine Learning + Cognitive | 47-59 | 42-54 | 37-49 |
| Basic + Machine Learning | 61-73 | 56-68 | 51-63 |
| Basic | 91-100 | 81-93 | 71-83 |

The potential identification module (210) is configured to then determine a current automation potential indicator for each of the one or more subsidiary processes in the tier five based on the category of automation and the score. The current automation potential indicator for each of the one or more subsidiary processes at the tier five involves an evaluation of the identified category of automation and the score against a predetermined threshold. Table 2 illustrates a threshold range of scores corresponding to each level of automation, in accordance with an exemplary embodiment of the invention.

TABLE 2

| | |
|---|---|
| High | 83-97 |
| Medium | 68-82 |
| Low | 53-67 |
| 0 | 0 |

The potential identification module (210) is configured to further compute a maximum automation potential indicator and a current automation potential indicator for each of the one or more subsidiary processes in the tier four based on maximum automation potential indicators and the current automation potential indicators for the corresponding one or more subsidiary processes in the tier five. In an exemplary embodiment, the maximum automation potential indicators for each of the one or more subsidiary processes in the tier five is determined by the potential identification module (210). The maximum automation potential indicator and the current automation potential indicator for each of the one or more subsidiary processes at the tier four are computed by calculating an average of the maximum automation potential indicator and the current automation potential indicator for the corresponding one or more subsidiary processes in the tier five. The potential identification module (210) is configured to compute a maximum automation potential indicator and a current automation potential indicator for each of the one or more subsidiary processes in the tier four by modifying the average by a factor, wherein the factor is based on one or more of field of enterprise, number of people in a team, time taken to perform the one or more subsidiary processes and distribution of the one or more subsidiary processes.

Further, the potential identification module (210) is configured to compute a maximum automation potential indicator and a current automation potential indicator for each of the one or more subsidiary processes in the tier three based on the maximum automation potential indicators and the current automation potential indicators for the corresponding one or more subsidiary processes in the tier four. The maximum automation potential indicator and the current automation potential indicator for each of the one or more subsidiary processes at the tier three are computed by calculating an average of the maximum automation potential indicators and the current automation potential indicators for the corresponding one or more tier four subsidiary processes within each of the one or more tier three subsidiary processes. The potential identification module (210) is configured to compute the maximum automation potential indicator and the current automation potential indicator for each of the one or more subsidiary processes in the tier three by modifying the average by the factor.

The potential identification module (210) is configured to compute a maximum automation potential indicator and a current automation potential indicator for each of the one or more subsidiary processes in the tier two based on the maximum automation potential indicators and the current automation potential indicators for the corresponding one or more subsidiary processes in the tier three. The potential identification module (210) is configured to compute the maximum automation potential indicator and the current automation potential indicator for each of the one or more subsidiary processes in the tier two by calculating a weighted average of the maximum automation potential indicators and the current automation potential indicators for the corresponding one or more subsidiary processes in the tier three, wherein the weighted average is calculated using a Full Time Equivalent (FTE) parameter.

The potential identification module (210) is further configured to compute a maximum automation potential indicator and current automation potential indicator for the process at the tier one based on the maximum automation potential indicators and the current automation potential indicators for the one or more subsidiary processes in the tier two. The maximum automation potential indicator and the current automation potential indicator for the process in the tier one are computed by calculating a weighted average of the maximum automation potential indicators and the automation potential indicators for the corresponding one or more subsidiary processes in the tier two, wherein the weighted average is calculated using the Full Time Equivalent (FTE) parameter. The current automation potential indicator computed for the tier one is a determination of the automation potential for the process and may be a numeric value.

The system (102) further comprises a maturity computation module (212) configured to compute an automation maturity index for each of the one or more subsidiary processes at the tier five by calculating a difference between the maximum automation potential indicator and the current automation potential indicator for each of the one or more subsidiary processes at the tier five.

The maturity computation module (212) is also configured to compute an automation maturity index for each of the one or more subsidiary processes in the tier four by calculating a difference between the maximum automation potential indicator and the current automation potential indicator for each of the one or more subsidiary processes in the tier four. The automation maturity index for each of the one or more subsidiary processes in the tier four is scaled to a percentage of the maximum automation potential indicator for the corresponding one or more subsidiary processes at the tier four. In other words, the automation maturity index for each of the one or more subsidiary processes is computed as per equation 1:

$$\text{Automation maturity index} = \text{(Difference between the maximum automation potential indicator and the current automation potential indicator} *100)/\text{Maximum Automation Potential} \quad (1)$$

The maturity computation module (212) is further configured to compute an automation maturity index for each of the one or more subsidiary processes at the tier three by calculating a difference between the maximum automation potential indicator and the current automation potential indicator for each of the one or more subsidiary processes at the tier three. The automation maturity index is scaled to a percentage of the maximum automation potential indicator for the corresponding one or more subsidiary processes at the tier three using the equation (1).

The maturity computation module (212) is further configured to compute an automation maturity index for each of the one or more processes at the tier two by calculating a difference between a maximum automation potential indicator and the current automation potential indicator for each of the one or more processes in the tier two. The automation maturity index for each of the one or more subsidiary processes at the tier two is scaled to a percentage of the maximum automation potential indicator computed for the corresponding one or more subsidiary processes at the tier two using the equation (1).

The maturity computation module (212) is further configured to compute an automation maturity index for the process at the tier one by calculating the difference between a maximum automation potential indicator and the current automation potential indicator for each of the one or more processes in the tier two. The automation maturity index for the process at the tier one is scaled to a percentage of the maximum automation potential indicator computed for the tier one using the equation (1).

The system (102) further comprises a productivity computation module (214) configured to determine a productivity potential to be attained post the automation of the process. The productivity potential is determined based on the automation potential and a Full Time Equivalent (FTE) parameter. The FTE parameter may be provided to the system (102) by a user through the user device (104). In one embodiment, the productivity computation module (214) is configured to compute the productivity potential at tiers three, two and one.

At tier three, the productivity computation module (214) is configured to determine a maximum productivity potential indicator and a current productivity potential indicator by computing an average of the maximum automation potential indicator and the current automation potential indicator for each of the one or more subsidiary processes at the tier three, wherein the maximum automation potential indicator and the current automation potential indicator for the tier three are computed by the potential identification module (210) as abovementioned i.e. by computing a maximum automation potential indicator and a current automation potential indicator at the tier five within tier four and subsequently for each of the one or more subsidiary processes at the tier four within the tier three. The computed average value is then multiplied by a 'Leakage percentage value' as the whole automation potential may not get converted into productivity. In an embodiment, the leakage percentage value is a default value pre-determined by the user. In another embodiment, the leakage percentage value is configured by the user at any time during the operation of the system (102). In an embodiment, the Leakage percentage value is different for each of the one or more subsidiary processes at the tier two.

At tier two, a weighted average maximum productivity potential indicator and a weighted average productivity potential indicator are determined on the basis of the FTE parameter.

Figure 3:
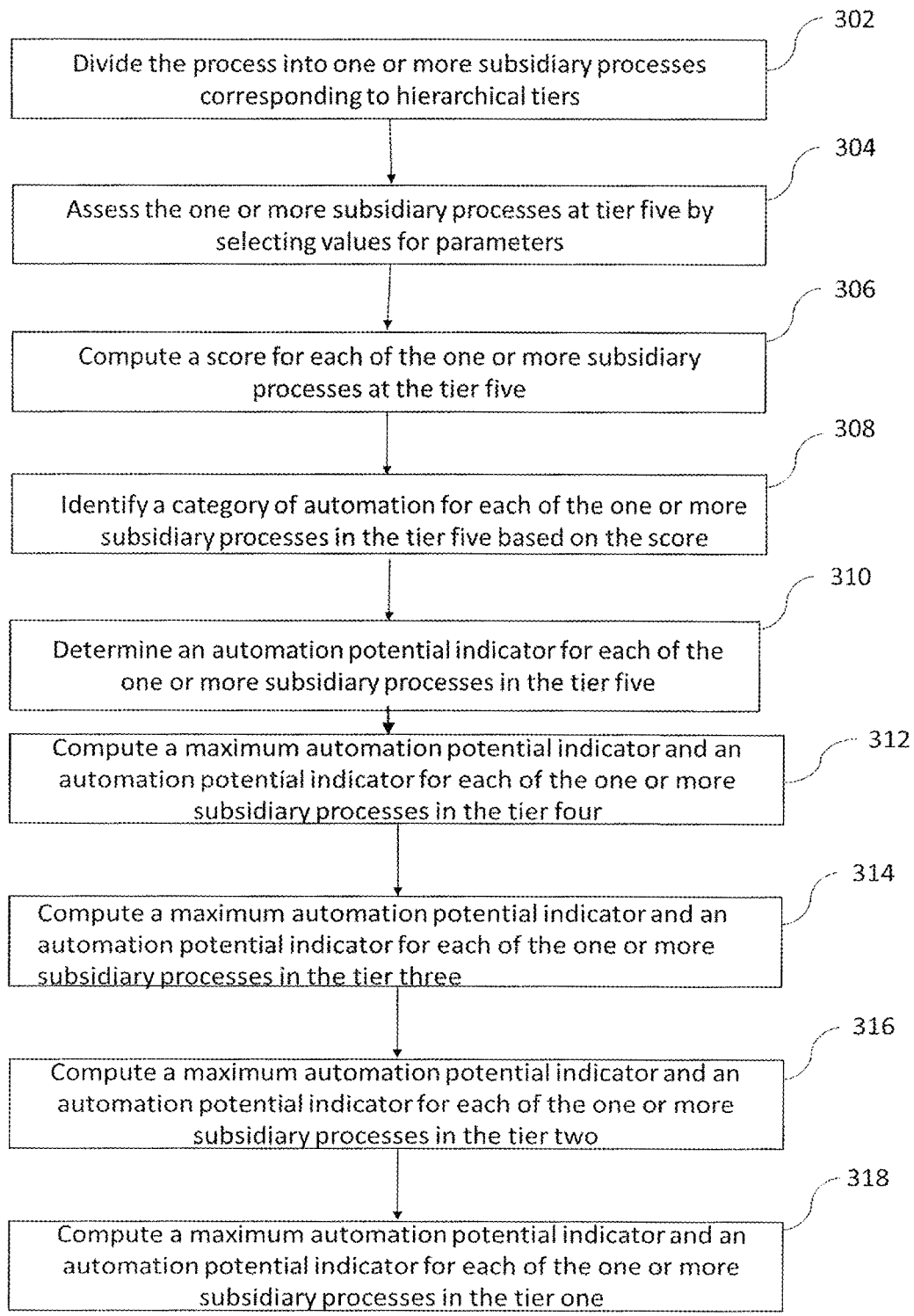
FIG. 3 illustrates a flow diagram of an exemplary method for determining automation potential of a process, in accordance with an embodiment of the present disclosure.

FIG. 3 illustrates a flowchart depicting an exemplary method 300 for determination of automation potential of a process, in accordance with an embodiment of the present disclosure. The method 300 of FIG. 3 implements the system of FIG. 2. The method 300 begins at step 302, wherein the process is divided into one or more subsidiary processes corresponding to one or more hierarchical tiers, wherein the hierarchical tiers are tier one, tier two, tier three, tier four and tier five. The division is performed such that tier one includes the end-to-end process to be divided, tier two includes the process areas within the end-to-end process, tier three includes sub-processes within each of the processes for all process of tier two, tier four includes activities or process steps within each of the sub-processes for all sub-process of tier three and tier five includes tasks or transactions at a keystroke level within each of the activities for all activities of tier four.

The method at step 304 comprises assessing the one or more subsidiary processes at the tier five by selecting a value from one or more values for each of the one or more parameters for each of the one or more subsidiary processes in the tier five.

At step 306, the method comprises computing a score for each of the one or more subsidiary processes in the tier five based on the values selected for each of the one or more parameters and the predetermined relative weight percentage assigned to each of the one or more parameters.

At step 308, a category of automation for each of the one or more subsidiary processes in the tier five is identified based on the score for each of the one or more subsidiary processes at the tier five. In addition to the determination of category of automation, step 308 also includes determining a level of automation within each category of automation based on the score for each of the one or more subsidiary processes in the tier five. The level of automation include a High level, a Medium level and a Low level of automation within each category of automation. Thus, depending upon the Score, every tier 5 task score goes into any one of the following categories:
 a) Basic: High/Medium/Low
 b) Basic+ML: High/Medium/Low
 c) Basic+ML+Cognitive: High/Medium/Low
 d) No Automation In an embodiment, the method comprises determining no corresponding category of automation for the one or more subsidiary processes, where automation is determined to be not required for one or more subsidiary processes based on the score.

At step 310, a current automation potential indicator for each of the one or more subsidiary processes in the tier five is determined based on the category of automation and the score. The current automation potential indicator for each of the one or more subsidiary processes at the tier five involves an evaluation of the identified category of automation and the score against a predetermined threshold. Thus, depending upon the level of automation, the current automation potential indicator is calculated for each of the one or more under subsidiary processes at tier five. In an embodiment, the current automation potential indicator for each of the one or more under subsidiary processes in accordance with the values of table 2 will be computed as follows:
 For basic category and High level, current automation potential indicator is in the range 83-97
 For basic along with machine learning category and High level, current automation potential indicator is in the range 83-97.
 For basic along with machine learning and cognitive category and High level, current automation potential indicator is in the range 83-97.

Similarly, for each category with a medium level of automation the current automation potential indicator is in the range 68-82 and with a low level of automation the current automation potential indicator is in the range 53-67. Further, the current automation potential indicator in case of no automation is 0.

The method, at step 312, comprises computing a maximum automation potential indicator and a current automation potential indicator for each of the one or more subsidiary processes in the tier four by calculating an average of the maximum automation potential indicator and the current automation potential indicator for the corresponding one or more subsidiary processes in the tier five and subsequently modifying the average by a factor. The factor is based on one or more of field of enterprise, number of people in a team, time taken to perform the one or more subsidiary processes and distribution of the one or more subsidiary processes.

Further, at step 314, the method comprises computing a maximum automation potential indicator and a current automation potential indicator for each of the one or more subsidiary processes in the tier three by calculating an average of the maximum automation potential indicator and the current automation potential indicator for the corresponding one or more tier four subsidiary processes within each of the one or more tier three subsidiary processes and then modifying the average by the factor.

At step 316, the method comprises computing a maximum automation potential indicator and a current automation potential indicator for each of the one or more subsidiary processes in the tier two based on the maximum automation potential indicators and the current automation potential indicators for the corresponding one or more subsidiary processes in the tier three. The maximum automation potential indicator and the current automation potential indicator for each of the one or more subsidiary processes in the tier two are computed by calculating a weighted average of the maximum automation potential indicators and the current automation potential indicators for the corresponding one or more subsidiary processes in the tier three, wherein the weighted average is calculated using a Full Time Equivalent (FTE) parameter.

At step 318, a maximum automation potential and a current automation potential indicator for the process at the tier one is computed based on the maximum automation potential indicators and the current automation potential indicators for the one or more subsidiary processes in the tier two. The maximum automation potential indicator and the current automation potential indicator for the process in the tier two one computed by calculating a weighted average of the maximum automation potential indicators and the current automation potential indicators for the corresponding one or more subsidiary processes in the tier two, wherein the weighted average is calculated using the Full Time Equivalent (FTE) parameter.

The method further comprises a computing a first automation maturity index for each of the one or more subsidiary processes at the tier five by calculating a difference between a maximum automation potential indicator and the current automation potential indicator for each of the one or more subsidiary processes at the tier five. A second automation maturity index for each of the one or more subsidiary processes in the tier four is computed by calculating a difference between the maximum automation potential indicator and the current automation potential indicator for each of the one or more subsidiary processes in the tier four and then scaling the difference value to a percentage of the maximum automation potential indicator for the corresponding one or more subsidiary processes at the tier four using the equation 1.

Further, the method comprises computing an automation maturity index for each of the one or more subsidiary processes at the tier three by calculating a difference between the maximum automation potential indicator and the current automation potential indicator for each of the one or more subsidiary processes at the tier three. The third automation maturity index is scaled to a percentage of the maximum automation potential indicator for the corresponding one or more subsidiary processes at the tier three using the equation (1).

Furthermore, a fourth automation maturity index for each of the one or more processes at the tier two is computed by calculating difference between a maximum automation potential indicator and the current automation potential indicator for each of the one or more processes in the tier two. The automation maturity index for each of the one or more subsidiary processes at the tier two is scaled to a percentage of the maximum automation potential indicator computed for the corresponding one or more subsidiary processes at the tier two using the equation (1).

Finally, a fifth automation maturity index for the process at the tier one by calculating the difference between a maximum automation potential indicator and the current automation potential indicator for each of the one or more processes in the tier two. The automation maturity index for the process at the tier one is scaled to a percentage of the maximum automation potential indicator computed for the tier one using the equation (1).

The method also comprises determining a productivity potential to be achieved post the automation of the process based on the automation potential and a Full Time Equivalent (FTE) parameter. The FTE parameter may be provided to the system (102) by a user through the user device (104). In one embodiment, the productivity computation module (214) is configured to compute the productivity potential at tiers three, two and one.

At tier three, a maximum productivity potential indicator and a productivity potential indicator are determined by computing an average of the maximum automation potential indicator and the current automation potential indicator for each of the one or more subsidiary processes at the tier three, wherein the maximum automation potential indicator and the current automation potential indicator for the tier three are computed by the potential identification module (210) as abovementioned i.e. by computing the maximum automation potential indicator and the current automation potential indicator at the tier five within the tier four and subsequently for each of the one or more subsidiary processes at the tier four within the tier three. The computed average value is then multiplied by a 'Leakage percentage value' as the whole automation potential may not get converted into productivity. In an embodiment, the leakage percentage value is a default value pre-determined by the user. In another embodiment, the leakage percentage value is configured by the user at any time during the operation of the system (102). In an embodiment, the Leakage percentage value is different for each of the one or more subsidiary processes at the tier two.

At tiers two and one, a weighted average maximum productivity potential indicator and a weighted average productivity potential indicator are determined on the basis of the FTE parameter.

Figure 4:
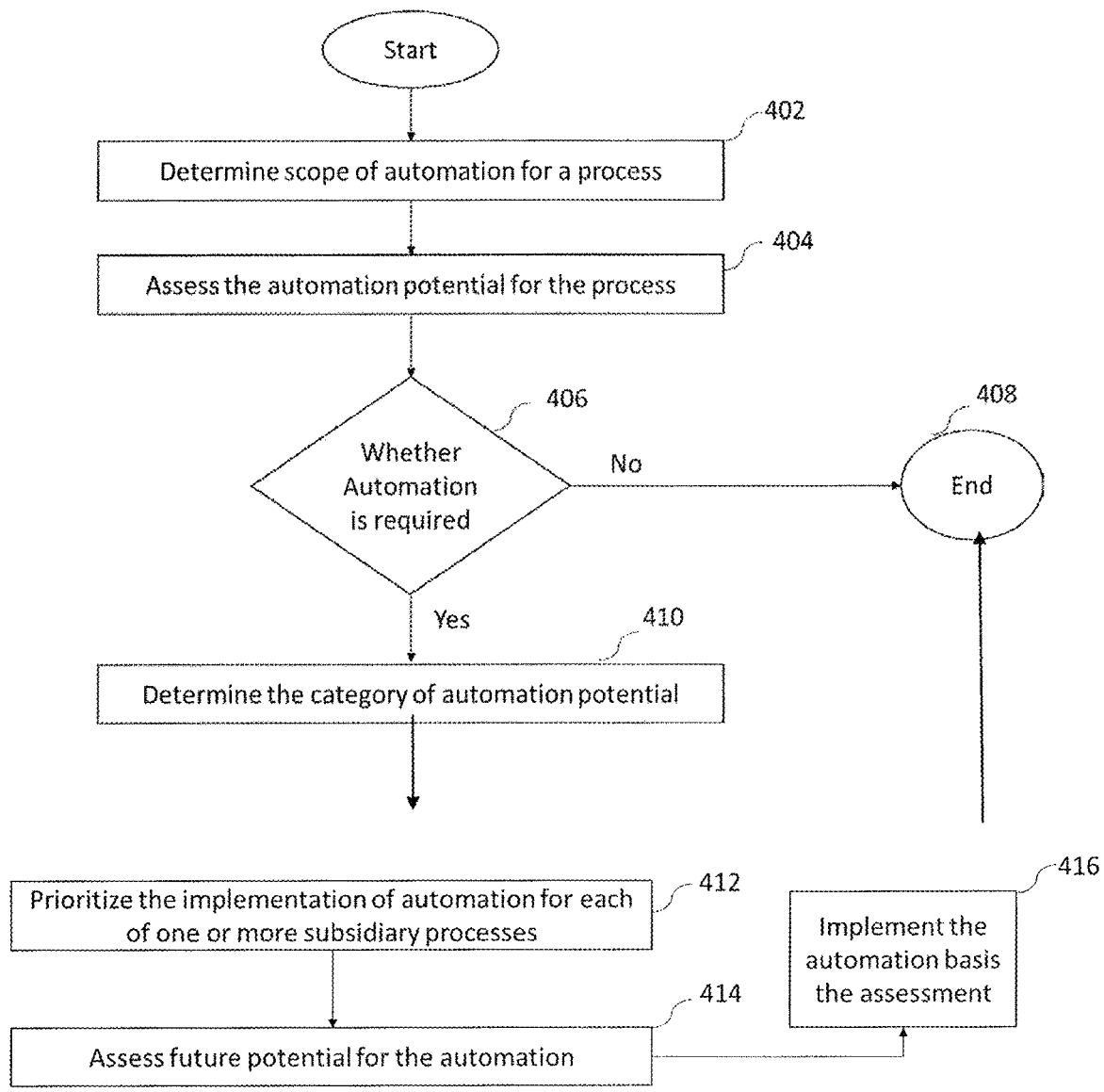
FIG. 4 illustrates a flow diagram of an exemplary scenario where the method of determination of automation potential is implemented.

FIG. 4 illustrates a flowchart depicting an exemplary scenario where the automation potential determined by the system (102) is implemented, in accordance with an exemplary embodiment of the present invention. In a first step 402, a determination of the scope of the automation is conducted. The step 402 includes determining the scope of automation for a process. This includes determining processes and sub processes, activities and tasks corresponding to the processes which require automation.

At step 404, an automation potential for the process is determined using the method disclosed above with reference to FIG. 3.

At step 406, the automation potential determined at step 404 is assessed to identify whether an automation is required. If the assessment of step 404 results in no requirement for automation, the process ends at step 408. If the assessment of step 404 results in an automation potential value, then at step 410, the category and level of automation required for the process are identified.

Once, the category and level of automation are identified, at step 412, the implementation of automation is prioritized for each of the one or more subsidiary process of the process.

Further, at step 414, a future potential for the automation is determined. This includes the comparing the present state of automation with the best in class scope of automation.

At step 416, the automation for one or more subsidiary processes is implemented in accordance with the prioritization of step 412 and the process ends at step 408. The system (102) includes a plurality of scenarios, best practices, process maps, exception logs and controls needs on how to deploy and implement the automation for the process.

FIG. 5A illustrate an exemplary interface of the present invention displaying a maximum automation potential indicator for the process at the tier one in accordance with an embodiment of the present invention. With reference to FIG. 5A, the maximum automation potential indicator value determined for the process at tier one is 47, wherein maximum automation potential indicator values for tier one for basic robotic automation, basic robotic along with machine learning automation and basic robotic along with machine learning and cognitive automation are 16, 12 and 18. FIG. 5B illustrate an exemplary interface of the present invention displaying a current automation potential indicator for the process RTR at the tier one in accordance with an embodiment of the present invention. With reference to FIG. 5B, the current automation potential indicator value determined for the process at tier one is 43, wherein current automation potential values for tier one for basic robotic automation, basic robotic along with machine learning automation and basic robotic along with machine learning and cognitive automation are 16, 9 and 8. FIGS. 5A and 5B depict RTR as a tier one process and a set of tier two subsidiary processes comprising Intercompany Accounting, Treasury, Consolidations and External Reporting, Statutory Accounting, Fixed Asset Accounting, Product Costing, Finance Master Data Maintenance, Inventory Controlling, Transfer Pricing, Manufacturing controlling, Management Reporting, Tax and General Accounting.

It will be appreciated by those skilled in the art that the system and method described herein above helps in assessment of potential for automation for a process which helps ensuring better value from investments in automating the process. In one embodiment, the system and method encompassed by the present invention may be used in determining the best suited automations for a process and the potential for productivity to be reaped post automation.

Although implementations for methods and systems for determining automation potential of a process have been described in language specific to structural features and/or methods, it is to be understood that the appended claims are not necessarily limited to the specific features or methods described. Rather, the specific features and methods are disclosed as examples of implementations for determination of automation potential of a process.

What is claimed is:

1. A processor-implemented method for determining an automation potential of an end-to-end process, the method comprising steps of:

dividing the end-to-end process into one or more subsidiary processes;

representing the end-to-end process in a hierarchical data structure stored in a non-transitory computer-readable medium and comprising hierarchical tiers, wherein the hierarchical tiers comprise tier one, tier two, tier three, tier four and tier five;

representing the end-to-end processes in the tier one of the hierarchical data structure;

representing process areas within the end-to-end process in the tier two of the hierarchical data structure;

representing subsidiary processes within the end-to-end process for process areas of the tier two in the tier three of the hierarchical data structure;

representing activities or process steps within each of the subsidiary processes of the tier three in the tier four of the hierarchical data structure;

representing tasks or transactions at a keystroke level within each of the activities or process steps of the tier four in the tier five of the hierarchical data structure;

assessing the one or more subsidiary processes by selecting a value from one or more values for each of one or more parameters for each of the one or more subsidiary processes represented in the tier five of the hierarchical data structure;

computing a score for each of the one or more subsidiary processes represented in the tier five of the hierarchical data structure, wherein the score is computed based on the selected values for each of the one or more parameters and a predetermined weight assigned to each of the one or more parameters;

identifying a category of automation for each of the one or more subsidiary processes represented in the tier five of the hierarchical data structure based on the score for each of the one or more subsidiary processes represented in the tier five of the hierarchical data structure;

determining a current automation potential indicator for each of the one or more subsidiary processes represented in the tier five of the hierarchical data structure based on the category of automation and the score;

computing a maximum automation potential indicator and a current automation potential indicator for each of the one or more subsidiary processes represented in the tier four of the hierarchical data structure based on maximum automation potential indicators and the current automation potential indicators for the corresponding one or more subsidiary processes represented in the tier five of the hierarchical data structure;

computing a maximum automation potential indicator and a current automation potential indicator for each of the one or more subsidiary processes represented in the tier three of the hierarchical data structure based on the maximum automation potential indicators and the current automation potential indicators for the corresponding one or more subsidiary processes represented in the tier four of the hierarchical data structure;

computing a maximum automation potential indicator and a current automation potential indicator for each of the one or more subsidiary processes represented in the tier two of the hierarchical data structure based on the maximum automation potential indicators and the current automation potential indicators for the corresponding one or more subsidiary processes represented in the tier three of the hierarchical data structure;

computing a maximum automation potential and a current automation potential indicator for the end-to-end process represented in the tier one of the hierarchical data structure based on the maximum automation potential indicators and the current automation potential indicators for the one or more subsidiary processes represented in the tier two of the hierarchical data structure, wherein the current automation potential indicator for the end-to-end process represented in the tier one of the hierarchical data structure represents the automation potential of the end-to-end process; and implementing automation for at least one of the one or more of the subsidiary processes.

2. The method of claim 1, wherein the current automation potential indicator for each of the one or more subsidiary processes in the tier five is computed based on an evaluation of the identified category and the computed score against a predetermined threshold.

3. The method of claim 1, further comprising computing a first automation maturity index for each of the one or more subsidiary processes in the tier five by calculating a difference between a maximum automation potential indicator and the current automation potential indicator for each of the one or more subsidiary processes in the tier five.

4. The method of claim 1, wherein the maximum automation potential indicator and the current automation potential indicator for each of the one or more subsidiary processes at each of the tier four and the tier three are computed by calculating an average of the maximum automation potential indicators and the current automation potential indicators for the corresponding one or more subsidiary processes in each of the tier five and the tier four respectively, wherein the average is modified by a factor, and wherein the factor is based on one or more of number of people in a team, time taken to perform the one or more subsidiary processes and distribution of the one or more subsidiary processes.

5. The method of claim 1, further comprising computing a second automation maturity index for each of the one or more subsidiary processes in the tier four by calculating a difference between the maximum automation potential indicator and the current automation potential indicator for each of the one or more subsidiary processes in the tier four, wherein the automation maturity index is scaled to a percentage of the maximum automation potential indicator for the corresponding one or more subsidiary processes at the tier four.

6. The method of claim 1, further comprising computing a third automation maturity index for each of the one or more subsidiary processes in the tier three by calculating a difference between the maximum automation potential indicator and the current automation potential indicator for each of the one or more subsidiary processes in the tier three, wherein the automation maturity index is scaled to a percentage of the maximum automation potential indicator for the corresponding one or more subsidiary processes in the tier three.

7. The method of claim 1, further comprising computing a fourth automation maturity index for each of the one or more processes in the tier two by calculating the difference between a maximum automation potential indicator and the current automation potential indicator for each of the one or more processes in the tier two, wherein the fourth automation maturity index is scaled to a percentage of the maximum automation potential indicator for the corresponding one or more subsidiary processes in the tier two.

8. The method of claim 1, wherein the maximum automation potential indicator and the automation potential indicator for each of the one or more subsidiary processes in the tier two are computed by calculating a weighted average of the maximum automation potential indicators and the current automation potential indicators for the corresponding one or more subsidiary processes in the tier three, wherein a Full Time Equivalent (FTE) parameter is used to calculate said weighted average.

9. The method of claim 1, further comprising computing a fifth automation maturity index for the process at the tier one by calculating the difference between a maximum automation potential indicator and the current automation potential indicator for each of the one or more processes in the tier one, wherein the fourth automation maturity index is scaled to a percentage of the maximum automation potential indicator for the corresponding process in the tier one.

10. The method of claim 1, further comprising determining a productivity potential for the process based on the automation potential of the process and a Full Time Equivalent (FTE) parameter.

11. A system for determining an automation potential of an end-to-end process, the system comprising:
  one or more hardware processors;
  a tangible, non-transitory memory coupled with the one or more hardware processors, the tangible, non-transitory memory having instructions stored thereon that, when executed by the one or more hardware processors, configure the one or more hardware processors to:
  divide the end-to-end process into one or more subsidiary processes;
  represent the end-to-end process in a hierarchical data structure stored in a non-transitory computer-readable medium and comprising hierarchical tiers, wherein the hierarchical tiers comprise tier one, tier two, tier three, tier four and tier five;
  represent the end-to-end processes in the tier one of the hierarchical data structure;
  represent process areas within the end-to-end process in the tier two of the hierarchical data structure;
  represent subsidiary processes within the end-to-end process for process areas of the tier two in the tier three of the hierarchical data structure;
  represent activities or process steps within each of the subsidiary processes of the tier three in the tier four of the hierarchical data structure;
  represent tasks or transactions at a keystroke level within each of the activities or process steps of the tier four in the tier five of the hierarchical data structure;
  assess the one or more subsidiary processes by selecting a value from one or more values for each of one or more parameters for each of the one or more subsidiary processes represented in the tier five of the hierarchical data structure;
  compute a score for each of the one or more subsidiary processes represented in the tier five of the hierarchical data structure, wherein the score is computed based on the selected values for each of the one or more parameters and a predetermined weight assigned to each of the one or more parameters;
  identify a category of automation for each of the one or more subsidiary processes represented in the tier five of the hierarchical data structure based on the score for each of the one or more subsidiary processes represented in the tier five of the hierarchical data structure;
  determine a current automation potential indicator for each of the one or more subsidiary processes represented in the tier five of the hierarchical data structure based on the category of automation and the score;
  compute a maximum automation potential indicator and a current automation potential indicator for each of the one or more subsidiary processes represented in the tier four of the hierarchical data structure based on maximum automation potential indicators and the current automation potential indicators for the corresponding one or more subsidiary processes represented in the tier five of the hierarchical data structure;
  compute a maximum automation potential indicator and a current automation potential indicator for each of the one or more subsidiary processes represented in the tier three of the hierarchical data structure based on the maximum automation potential indicators and the current automation potential indicators for the corresponding one or more subsidiary processes represented in the tier four of the hierarchical data structure;

compute a maximum automation potential indicator and a current automation potential indicator for each of the one or more subsidiary processes represented in the tier two of the hierarchical data structure based on the maximum automation potential indicators and the current automation potential indicators for the corresponding one or more subsidiary processes represented in the tier three of the hierarchical data structure;

compute a maximum automation potential and a current automation potential indicator for the end-to-end process represented in the tier one of the hierarchical data structure based on the maximum automation potential indicators and the current automation potential indicators for the one or more subsidiary processes represented in the tier two of the hierarchical data structure, wherein the current automation potential indicator for the end-to-end process represented in the tier one of the hierarchical data structure represents the automation potential of the end-to-end process; and implement automation for at least one of the one or more of the subsidiary processes.

12. The system of claim 11, wherein the current automation potential indicator for each of the one or more subsidiary processes in the tier five is computed based on an evaluation of the identified category and the computed score against a predetermined threshold.

13. The system of claim 11, wherein the one or more hardware processors is configured to compute a first automation maturity index for each of the one or more subsidiary processes in the tier five by calculating a difference between a maximum automation potential indicator and the current automation potential indicator for each of the one or more subsidiary processes in the tier five.

14. The system of claim 11, wherein the maximum automation potential indicator and the current automation potential indicator for each of the one or more subsidiary processes at each of the tier four and the tier three are computed by calculating an average of the maximum automation potential indicators and the current automation potential indicators for the corresponding one or more subsidiary processes in each of the tier five and the tier four respectively, wherein the average is modified by a factor, and wherein the factor is based on one or more of number of people in a team, time taken to perform the one or more subsidiary processes and distribution of the one or more subsidiary processes.

15. The system of claim 11, wherein the one or more hardware processors is configured to compute a second automation maturity index for each of the one or more subsidiary processes in the tier four by calculating a difference between the maximum automation potential indicator and the current automation potential indicator for each of the one or more subsidiary processes in the tier four, wherein the automation maturity index is scaled to a percentage of the maximum automation potential indicator for the corresponding one or more subsidiary processes in the tier four.

16. The system of claim 11, wherein the one or more hardware processors is configured to compute a third automation maturity index for each of the one or more subsidiary processes in the tier three by calculating a difference between the maximum automation potential indicator and the current automation potential indicator for each of the one or more subsidiary processes in the tier three, wherein the automation maturity index is scaled to a percentage of the maximum automation potential indicator for the corresponding one or more subsidiary processes in the tier three.

17. The system of claim 11, the one or more hardware processors is configured to compute a fourth automation maturity index for each of the one or more processes in the tier two by calculating the difference between a maximum automation potential indicator and the current automation potential indicator so determined for each of the one or more processes in the tier two, wherein the fourth automation maturity index is scaled to a percentage of the maximum automation potential indicator computed for the tier two.

18. The system of claim 11, wherein the maximum automation potential indicator and the current automation potential indicator for each of the one or more subsidiary processes in the tier two are computed by calculating a weighted average of the maximum automation potential indicators and the current automation potential indicators for the corresponding one or more subsidiary processes in the tier three, wherein a Full Time Equivalent (FTE) parameter is used to calculate said weighted average.

19. The system of claim 11, wherein the one or more hardware processors is configured to compute a fifth automation maturity index for the process in the tier one by calculating the difference between a maximum automation potential indicator and the current automation potential indicator so determined for each of the one or more processes in the tier one, wherein the fourth automation maturity index is scaled to a percentage of the maximum automation potential indicator for the corresponding process in the tier one.

20. The system of claim 11, wherein the one or more hardware processors is configured to determine a productivity potential for the process based on the automation potential of the process and a Full Time Equivalent (FTE) parameter.

21. A non-transitory computer readable medium having embodied thereon computer program instructions for determining an automation potential of an end-to-end process, the computer program instructions comprising instructions for configuring a processor to perform operations comprising:

dividing the end-to-end process into one or more subsidiary processes;

representing the end-to-end process in a hierarchical data structure stored in a non-transitory computer-readable medium and comprising hierarchical tiers, wherein the hierarchical tiers comprise tier one, tier two, tier three, tier four and tier five;

representing the end-to-end processes in the tier one of the hierarchical data structure;

representing process areas within the end-to-end process in the tier two of the hierarchical data structure;

representing subsidiary processes within the end-to-end process for process areas of the tier two in the tier three of the hierarchical data structure;

representing activities or process steps within each of the subsidiary processes of the tier three in the tier four of the hierarchical data structure;

representing tasks or transactions at a keystroke level within each of the activities or process steps of the tier four in the tier five of the hierarchical data structure;

assessing the one or more subsidiary processes by selecting a value from one or more values for each of one or more parameters for each of the one or more subsidiary processes represented in the tier five of the hierarchical data structure;

computing a score for each of the one or more subsidiary processes represented in the tier five of the hierarchical data structure, wherein the score is computed based on the selected values for each of the one or more parameters and a predetermined weight assigned to each of the one or more parameters;

identifying a category of automation for each of the one or more subsidiary processes represented at the tier five of the hierarchical data structure based on the score for each of the one or more subsidiary processes represented in the tier five of the hierarchical data structure;

determining a current automation potential indicator for each of the one or more subsidiary processes represented in the tier five of the hierarchical data structure based on the category of automation and the score;

computing a maximum automation potential indicator and a current automation potential indicator for each of the one or more subsidiary processes represented in the tier four of the hierarchical data structure based on maximum automation potential indicators and the current automation potential indicators for the corresponding one or more subsidiary processes represented in the tier five of the hierarchical data structure;

computing a maximum automation potential indicator and a current automation potential indicator for each of the one or more subsidiary processes represented in the tier three of the hierarchical data structure based on the maximum automation potential indicators and the current automation potential indicators for the corresponding one or more subsidiary processes represented in the tier four of the hierarchical data structure;

computing a maximum automation potential indicator and a current automation potential indicator for each of the one or more subsidiary processes represented in the tier two of the hierarchical data structure based on the maximum automation potential indicators and the current automation potential indicators for the corresponding one or more subsidiary processes represented in the tier three of the hierarchical data structure;

computing a maximum automation potential and a current automation potential indicator for the end-to-end process represented in the tier one of the hierarchical data structure based on the maximum automation potential indicators and the current automation potential indicators for the one or more subsidiary processes represented in the tier two of the hierarchical data structure, wherein the automation potential indicator for the end-to-end process represented in the tier one of the hierarchical data structure represents the automation potential of the end-to-end process; and implementing automation for at least one of the one or more of the subsidiary processes.

22. The computer readable medium of claim 21, wherein the current automation potential indicator for each of the one or more subsidiary processes in the tier five is computed based on an evaluation of the identified category and the computed score against a predetermined threshold.

23. The computer readable medium of claim 21, further comprising computing a first automation maturity index for each of the one or more subsidiary processes in the tier five by calculating a difference between a maximum automation potential indicator and the current automation potential indicator for each of the one or more subsidiary processes in the tier five.

24. The computer readable medium of claim 21, wherein the maximum automation potential indicator and the current automation potential indicator for each of the one or more subsidiary processes at each of the tier four and the tier three are computed by calculating an average of the maximum automation potential indicators and the current automation potential indicators for the corresponding one or more subsidiary processes in each of the tier five and the tier four respectively, wherein the average is modified by a factor, and wherein the factor is based on one or more of number of people in a team, time taken to perform the one or more subsidiary processes and distribution of the one or more subsidiary processes.

25. The computer readable medium of claim 21, further comprising computing a second automation maturity index for each of the one or more subsidiary processes in the tier four by calculating a difference between the maximum automation potential indicator and the current automation potential indicator for each of the one or more subsidiary processes in the tier four, wherein the automation maturity index is scaled to a percentage of the maximum automation potential indicator for the corresponding one or more subsidiary processes in the tier four.

26. The computer readable medium of claim 21, further comprising computing a third automation maturity index for each of the one or more subsidiary processes in the tier three by calculating a difference between the maximum automation potential indicator and the current automation potential indicator for each of the one or more subsidiary processes in the tier three, wherein the automation maturity index is scaled to a percentage of the maximum automation potential indicator for the corresponding one or more subsidiary processes in the tier three.

27. The computer readable medium of claim 21, further comprising computing a fourth automation maturity index for each of the one or more processes in the tier two by calculating the difference between a maximum automation potential indicator and the current automation potential indicator so determined for each of the one or more processes in the tier two, wherein the fourth automation maturity index is scaled to a percentage of the maximum automation potential indicator computed for the tier two.

28. The computer readable medium of claim 21, wherein the maximum automation potential indicator and the current automation potential indicator for each of the one or more subsidiary processes in the tier two are computed by calculating a weighted average of the maximum automation potential indicators and the current automation potential indicators for the corresponding one or more subsidiary processes in the tier three, wherein a Full Time Equivalent (FTE) parameter is used to calculate said weighted average.

29. The computer readable medium of claim 21, further comprising computing a fifth automation maturity index for the process in the tier one by calculating the difference between a maximum automation potential indicator and the current automation potential indicator so determined for each of the one or more processes in the tier one, wherein the fourth automation maturity index is scaled to a percentage of the maximum automation potential indicator for the corresponding process in the tier one.

30. The computer readable medium of claim 21, further comprising determining a productivity potential for the process based on the automation potential of the process and a Full Time Equivalent (FTE) parameter.

* * * * *